(12) United States Patent
Esterbauer

(10) Patent No.: US 9,605,794 B2
(45) Date of Patent: Mar. 28, 2017

(54) SUPPORT ARM CONNECTION

(71) Applicant: BERNECKER + RAINER INDUSTRIE-ELEKTRONIK Ges.m.b.H., Eggelsberg (AT)

(72) Inventor: Hermann Esterbauer, Tarsdorf (AT)

(73) Assignee: BERNECKER + RAINER INDUSTRIE-ELEKTRONIK Ges.m.b.H., Eggelsberg (AT)

(*) Notice: Subject to any disclaimer, the term of this patent is extended or adjusted under 35 U.S.C. 154(b) by 0 days.

(21) Appl. No.: 14/414,014

(22) PCT Filed: Jul. 1, 2013

(86) PCT No.: PCT/EP2013/063767
§ 371 (c)(1),
(2) Date: Jan. 9, 2015

(87) PCT Pub. No.: WO2014/009188
PCT Pub. Date: Jan. 16, 2014

(65) Prior Publication Data
US 2015/0176753 A1   Jun. 25, 2015

(30) Foreign Application Priority Data

Jul. 10, 2012 (AT) .............................. A 50276/2012

(51) Int. Cl.
*E04B 9/00* (2006.01)
*F16M 11/08* (2006.01)
(Continued)

(52) U.S. Cl.
CPC ............ *F16M 11/08* (2013.01); *F16M 13/02* (2013.01); *F21S 8/06* (2013.01); *E04B 9/006* (2013.01)

(58) Field of Classification Search
CPC .... E04B 9/006; F21S 8/06; Y10T 403/32975; Y10T 403/32983; F16M 11/08; F16M 13/02
(Continued)

(56) References Cited

U.S. PATENT DOCUMENTS 2,602,990 A   7/1952 Ferguson
3,022,034 A * 2/1962 Purdy ........................... 248/342
(Continued)

FOREIGN PATENT DOCUMENTS

DE   200 21 626   4/2001
EP   0 496 191    7/1992
(Continued)

OTHER PUBLICATIONS

Austrian Search Report conducted in counterpart Austrian Appln. No. A 50276/2012 (May 13, 2013).
(Continued)

Primary Examiner — Nkeisha Smith
(74) Attorney, Agent, or Firm — Greenblum & Bernstein, P.L.C.

(57) ABSTRACT

Support arm connection for a component includes a support arm holder disposed on the component and a support arm having an end and being insertable into the support arm holder. A housing ring is disposed on the support arm. A support arm ring is disposed on the support arm. The housing ring is axially located further away from the end of the support arm than the support arm ring. A radially inwardly protruding shoulder of the support arm holder includes a stop surface. When the support arm is inserted into and mounted to the support arm holder, the stop surface limits axial movement of the support arm ring, the housing ring is fixedly secured to the support arm holder and the support arm ring is fixedly secured to the support arm.

20 Claims, 2 Drawing Sheets

(51) Int. Cl.
*F21S 8/06* (2006.01)
*F16M 13/02* (2006.01)

(58) Field of Classification Search
USPC ....... 248/317, 343, 344, 327, 917, 918, 919,
248/342; 361/679.01, 679.02, 679.05
See application file for complete search history.

(56) References Cited

U.S. PATENT DOCUMENTS

| | | | | |
|---|---|---|---|---|
| 3,561,719 | A | * | 2/1971 | Grindle ........................ 248/343 |
| 4,088,291 | A | | 5/1978 | Delaplaine et al. |
| 8,002,227 | B2 | * | 8/2011 | Garcia et al. .............. 248/278.1 |
| 2005/0230590 | A1 | * | 10/2005 | Westbrook ................... 248/327 |
| 2008/0296459 | A1 | * | 12/2008 | Frampton et al. ........... 248/343 |
| 2009/0126157 | A1 | * | 5/2009 | Garcia et al. ................. 16/348 |
| 2009/0294620 | A1 | * | 12/2009 | Lin .............................. 248/343 |
| 2011/0121151 | A1 | * | 5/2011 | Stifal ........................ 248/284.1 |

FOREIGN PATENT DOCUMENTS

| | | |
|---|---|---|
| EP | 2 096 349 | 9/2009 |
| EP | 2 325 541 | 5/2011 |
| JP | 02-120974 | 10/1990 |

OTHER PUBLICATIONS

International Search Report and Written Opinion conducted in Int'l Appln. PCT/EP2013/063767 (PCT/ISA/210 & 237) (Sep. 25, 2013).
International Preliminary Examination Report in Int'l Appln. PCT/EP2013/063767 (PCT/IPEA/409 & 416) (Sep. 15, 2014).
English language translation of PCT/IPEA/409 issued in PCT/EP2013/063767 (5 pages).

* cited by examiner

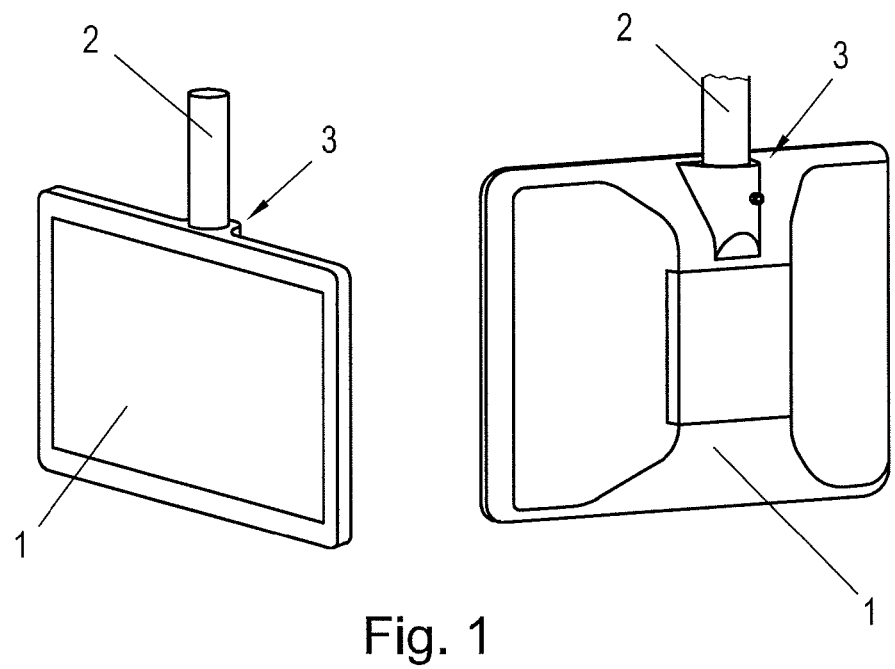
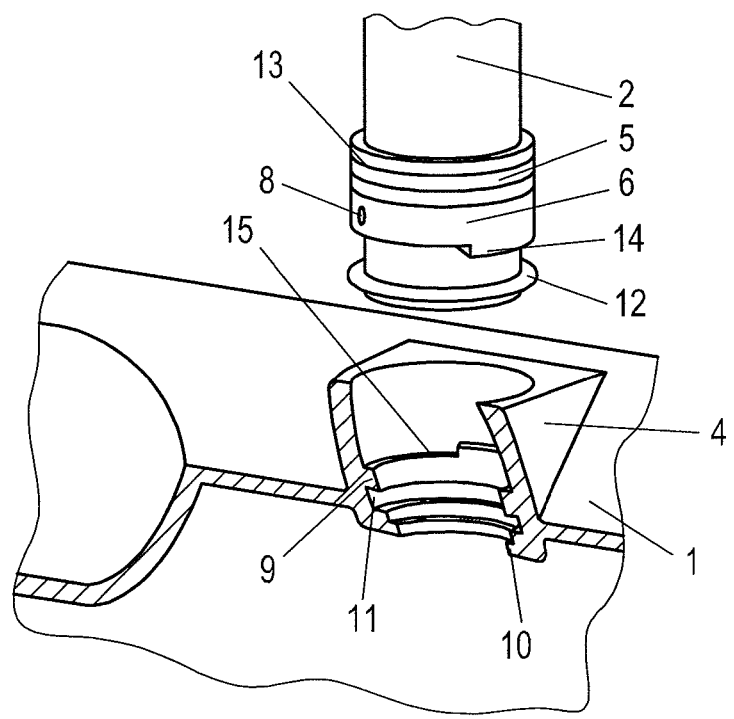
Fig. 1
Fig. 2

SUPPORT ARM CONNECTION

CROSS-REFERENCE TO RELATED APPLICATIONS

The present application is a US National Stage Application of International Application No. PCT/EP2013/063767 filed Jul. 1, 2013 which published as WO 2014/009188 on Jan. 16, 2014. This application also claims the right of priority granted under 35 U.S.C. §§119 and 365 of Austrian Application No. A50276/2012 filed on Jul. 10, 2012.

BACKGROUND OF THE INVENTION

1. Field of the Invention

The present invention relates to a support arm connection for a component, comprising a support arm and a support arm holder which is disposed on the component and in which the support arm is inserted.

2. Discussion of Background Information

In an industrial environment, such as in the case of production equipment, control consoles and the like, input and output devices in the form of control panels are used, wherein the control panels are often attached to support arms, which allow a certain adjustability of the position of the control panel. Known support arm systems either have a complex design, require a large installation space, or offer only limited freedom of movement.

EP 0 496 191 A1 shows a device carrier coupling for a device that is rotatably suspended on a vertically oriented support tube. EP 2 325 541 A1 and EP 2 096 349 A2 show assembly options for a supporting element or one or more brackets. U.S. Pat. No. 2,602,990 A shows a lifting/pivoting column, which is used to be able to bring appropriate work pieces into a convenient working position. U.S. Pat. No. 4,088,291 A shows a device that allows scientific instruments to be positioned as precisely as possible, wherein a device holder is rotatably disposed on a shaft.

SUMMARY OF THE INVENTION

It is therefore an object of the present invention to design a support arm connection in as simple a manner as possible, while achieving a slender design and high freedom of movement.

This object is achieved according to the invention by disposing a housing ring and a support arm ring on the support arm, wherein the housing ring is disposed further away from the axial end of the support arm than the support arm ring and is attached in the support arm holder, and the support arm ring is attached to the support arm, and a radially inwardly protruding shoulder, which forms an axial stop for the support arm ring, is provided in the support arm holder. In this way, a support arm connection can be implemented using very few, simple components, the connection having a simple design, allowing flexible use, having a very compact design, and nonetheless enabling a wide pivot range.

If an axially protruding nose which engages in an axial recess on the shoulder is provided on the support arm ring, a pivot range of the support arm in the support arm holder can be very easily defined. Using an axial stop for the support arm at the axial end of the support arm holder, a defined position of the support arm in the support arm holder can be ensured, and thus also a defined position of the housing ring and of the support arm ring on the support arm. This facilitates the sub-assembly of the rings on the support arm, by way of which the fully assembled component is now mounted on the support arm.

To seal the support arm connection, it is advantageous if a circumferential groove for receiving a sealing ring is provided in the support arm holder and/or if a circumferential groove for receiving a sealing ring is provided in the housing ring.

A certain position of the support arm in the support arm holder can be fixed easily and quickly if a locking mechanism for fixing the position of the support arm in the support arm holder is provided on the support arm holder.

The invention also provides for a support arm connection for a component, comprising a support arm holder disposed on the component and a support arm having an end and being insertable into the support arm holder. A housing ring is disposed on the support arm. A support arm ring is disposed on the support arm. The housing ring is axially located further away from the end of the support arm than the support arm ring. A radially inwardly protruding shoulder of the support arm holder includes a stop surface. When the support arm is inserted into and mounted to the support arm holder, the stop surface limits axial movement of the support arm ring, the housing ring is fixedly secured to the support arm holder and the support arm ring is fixedly secured to the support arm.

In embodiments, the support arm ring comprises an axially protruding nose that engages with an axial recess arranged on the radially inwardly protruding shoulder.

In embodiments, the connection further comprises a second stop surface arranged at an axial end of the support arm holder and being configured to limit axial movement of the support arm.

In embodiments, the connection further comprises a circumferential groove arranged in the support arm holder and being configured to receive a sealing ring.

In embodiments, the sealing ring is arranged on the support arm.

In embodiments, the housing ring comprises a circumferential groove configured to receive a sealing ring.

In embodiments, the support arm is prevented from moving with respect to the support arm holder by a lock.

In embodiments, the lock is mounted to the support arm holder.

In embodiments, the lock is screw.

The invention also provides for a support arm connection for a component, comprising a support arm holder disposed on the component and comprising an open end and an internal stop and a support arm having a free end insertable into the open end of the support arm holder. A housing ring is mounted to the support arm at a position axially spaced from the free end. A support arm ring is fixedly secured to the support arm at a location between the free end and the housing ring. When the support arm is inserted into and mounted to the support arm holder, the internal stop abuts the support arm ring and the support arm ring is located inside the support arm holder.

In embodiments, the support arm ring comprises an axially protruding nose that engages with an axial recess arranged on the radially inwardly protruding shoulder.

In embodiments, the connection further comprises a second stop surface located inside the support arm holder and being configured to limit axial movement of the support arm.

In embodiments, the connection further comprises a circumferential groove arranged in the support arm holder and being configured to receive a sealing ring.

In embodiments, the sealing ring is arranged on the support arm between the free end and the support arm ring.

In embodiments, the housing ring comprises a circumferential groove configured to receive a sealing ring.

In embodiments, the support arm is a tube and is prevented from moving with respect to the support arm holder by a lock.

In embodiments, the lock is mounted to the support arm holder.

In embodiments, the lock is screw.

The invention also provides for a support arm connection for a component, comprising a support arm holder disposed on the component and comprising an open end and an internal stop axially spaced from the open end. A support arm has a free end insertable into the open end of the support arm holder. A housing ring is mounted to the support arm at a position axially spaced from the free end. The housing ring is sized and configured to slide into the support arm holder while mounted on the support arm. A support arm ring is fixedly secured to the support arm at a location between the free end and the housing ring. The support arm ring is sized and configured to slide into the support arm holder while mounted on the support arm. When the support arm is mounted to the support arm holder, the support arm ring abuts the internal stop.

In embodiments, the component is a control panel.

BRIEF DESCRIPTION OF THE DRAWINGS

The present invention will be described in more detail hereafter with reference to FIGS. 1 to 3, which show advantageous embodiments of the invention by way of example and in a non-limiting manner. In the drawings:

FIG. 1 shows a front and rear view of a control panel comprising a support arm connection according to the invention;

FIG. 2 shows a sectional view through a support arm connection according to the invention in the divided state.

DETAILED DESCRIPTION OF THE INVENTION

Figure 3:
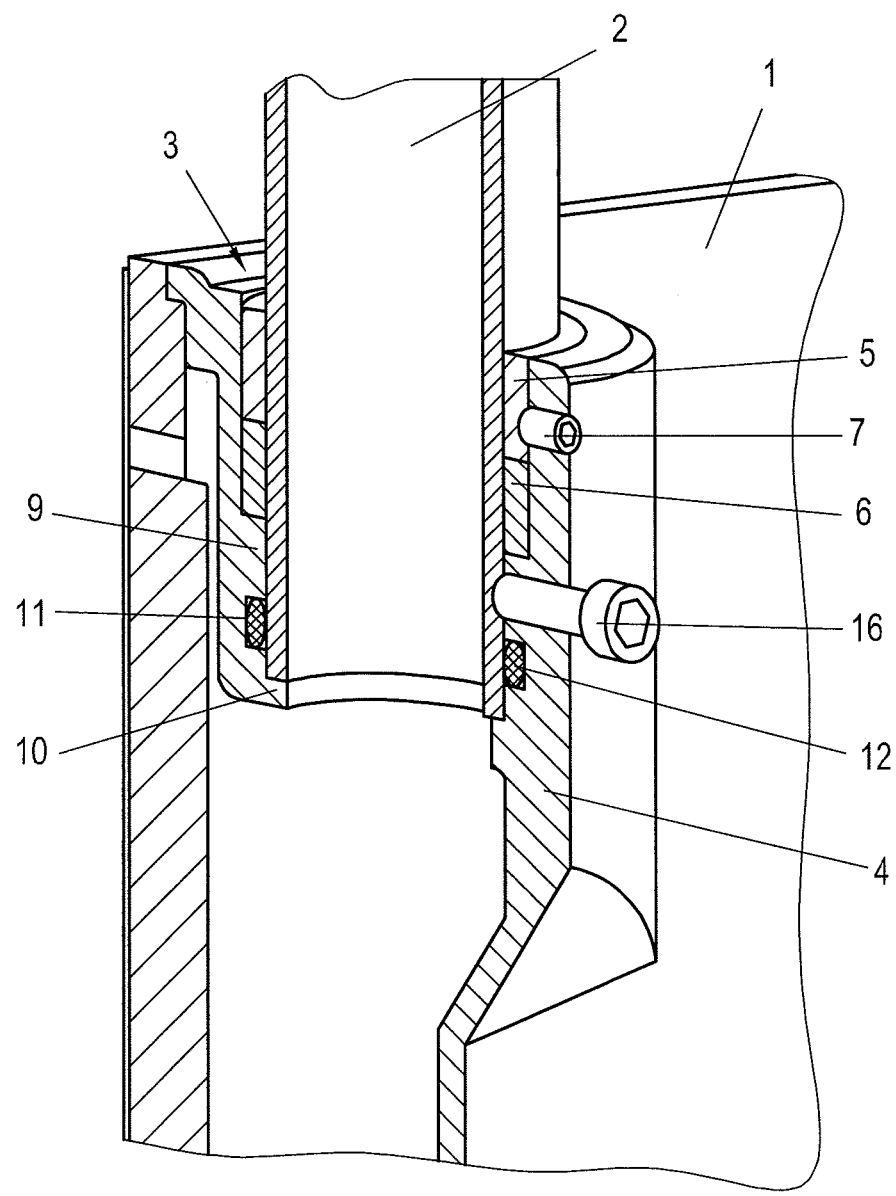
FIG. 3 shows a sectional view through a support arm connection according to the invention in the mounted state.

FIG. 1 shows a control panel 1 from the front and from the rear. The control panel 1 is attached to a support arm 2 by way of a support arm connection 3 according to the invention. Of course any other component could also be attached to the support arm 2, instead of a control panel 1. The invention will be described hereafter based on a control panel 1 by way of example.

The support arm connection 3 comprises a support arm 2 and a support arm holder 4 (FIG. 2). The support arm 2 can be designed as a round tube, wherein one end of the support arm 2 is inserted into a support arm holder 4 (FIG. 3) and held therein by a dedicated mechanism. The other end of the support arm 2, which is not shown here, can be attached to any arbitrary location, such as on a machine or on a wall. The support arm holder 4 here is integrally formed on the housing of the control panel 1 in the manner of a sleeve, but can also be designed and disposed in any arbitrary other manner, such as a separate component, which is attached to the control panel, or as part of a pivot joint (such as of a known VESA mounting).

At least the portion of the support arm 2 which is inserted into the support arm holder 4 is cylindrical to allow the control panel 1 to be pivoted about the longitudinal axis of the support arm 2. At the axial end of the support arm 2, two mounting rings are disposed axially next to each other, and preferably axially bearing on one another, wherein the housing ring 5 is disposed further away from the axial end of the support arm 2 than the support arm ring 6. The housing ring 5 is connected to the support arm holder 4, for example, it is clamped by way of headless screws 7 that are screwed into the support arm holder 4, as is shown in FIG. 3. The support arm ring 6 is attached to the support arm 2, for example, it is clamped by way of headless screws 8 that are screwed into the support arm ring 6. A radially inwardly protruding shoulder 9 is provided in the support arm holder 4, the inside diameter of the shoulder preferably corresponding approximately to the outside diameter of the support arm 2 so as to guide the support arm 2 in the support arm holder 4. The shoulder 9 forms an axial stop for the support arm ring 6, which in the mounted state is preferably seated with the axial end face thereof facing the shoulder 9 against the shoulder 9. The housing ring 5, the support arm ring 6 and the shoulder 9 thus cooperate in such a way that, on the one hand, the control panel 1 is prevented from being lifted off the support arm 2 (if the control panel 1 is placed from above onto the support arm 2) or from falling off the same, and, on the other hand, it is ensured that the support arm 2 cannot be pulled out of the support arm holder 4. At the same time, this ensures the pivotability about the longitudinal axis of the support arm 2.

Moreover an axial stop 10, for example in the form of a radially inwardly protruding shoulder, can be disposed at the axial end of the support arm holder 4 to prevent the support arm 2 from being pushed too deeply into the support arm holder 4, or to create a defined position for the housing ring 5 and the support arm ring 6 on the support arm 2.

Likewise, a circumferential groove 11 can be provided in the support arm holder 4, preferably in the region of the axial end of the support arm holder 4 between the shoulder 9 and the stop 10, a sealing ring 12 to provide sealing between the support arm 2 and the support arm holder 4 being disposable in this circumferential groove, so as to prevent dirt or a liquid medium from being able to penetrate along the support arm 2 into the interior of the housing of the control panel 1. Likewise, a circumferential groove 13 can be provided radially on the outside of the housing ring 5, in which likewise a sealing ring to provide sealing between the housing ring 5 and the support arm holder 4 can be disposed.

The support arm ring 6 can be designed with an axially protruding nose 14, wherein the nose 14 faces the shoulder 9. For this purpose, an axial recess 15 extending in the circumferential direction can be provided on the shoulder 9, the nose 14 engaging in this recess. In this way, the pivot range of the control panel 1 can be fixed over the circumferential length of the recess 15.

Likewise, a locking mechanism 16, such as in the form of a screw, can be provided on the support arm holder 4 so as to fix the control panel 1 in a certain position, for example to clamp it by way of a screw.

The invention claimed is:

1. A support arm connection connecting a support arm and a component, comprising:
   a support arm holder disposed on the component;
   the support arm having an end, the end being insertable into the support arm holder;
   a housing ring disposed on the support arm;
   a support arm ring disposed on the support arm;

the housing ring being axially located further away from the end of the support arm than the support arm ring; and a radially inwardly protruding shoulder of the support arm holder includes a stop surface, wherein, when the support arm is inserted into and mounted to the support arm holder:
the stop surface limits axial movement of the support arm ring;
the housing ring is rotationally fixedly secured to the support arm holder; and
the support arm ring is fixedly secured to the support arm.

2. The support arm connection of claim 1, wherein the support arm ring comprises an axially protruding nose that engages with an axial recess arranged on the radially inwardly protruding shoulder.

3. The support arm connection of claim 1, further comprising a second stop surface arranged at an axial end of the support arm holder and being configured to limit axial movement of the support arm.

4. The support arm connection of claim 1, further comprising a circumferential groove arranged in the support arm holder and being configured to receive a sealing ring.

5. The support arm connection of claim 4, wherein the sealing ring is arranged on the support arm.

6. The support arm connection of claim 1, wherein the support arm is prevented from moving with respect to the support arm holder by a lock.

7. The support arm connection of claim 6, wherein the lock is mounted to the support arm holder.

8. The support arm connection of claim 6, wherein the lock is screw.

9. A support arm connection connecting a support arm and a component, comprising:
a support arm holder disposed on the component;
the support arm having an end and being insertable into the support arm holder;
a housing ring disposed on the support arm;
a support arm ring disposed on the support arm;
the housing ring being axially located further away from the end of the support arm than the support arm ring; and
a radially inwardly protruding shoulder of the support arm holder includes a stop surface,
wherein, when the support arm is inserted into and mounted to the support arm holder:
the stop surface limits axial movement of the support arm ring;
the housing ring is fixedly secured to the support arm holder; and
the support arm ring is fixedly secured to the support arm, and
wherein the housing ring comprises a circumferential groove configured to receive a sealing ring.

10. A support arm connection connecting a support arm and a component, comprising:
a support arm holder disposed on the component and comprising an open end and an internal stop;
the support arm having a free end insertable into the open end of the support arm holder;
a housing ring mounted to the support arm at a position axially spaced from the free end;
the housing ring having an inside diameter disposed adjacent an outside diameter of the support arm;
a support arm ring fixedly secured to the support arm at a location between the free end and the housing ring;
wherein, when the support arm is inserted into and mounted to the support arm holder:
the housing ring is rotationally fixedly secured to the support arm holder;
the internal stop abuts the support arm ring; and
the support arm ring is located inside the support arm holder.

11. The support arm connection of claim 10, wherein the support arm ring comprises an axially protruding nose that engages with an axial recess arranged on the radially inwardly protruding shoulder.

12. The support arm connection of claim 10, further comprising a second stop surface located inside the support arm holder and being configured to limit axial movement of the support arm.

13. The support arm connection of claim 10, further comprising a circumferential groove arranged in the support arm holder and being configured to receive a sealing ring.

14. The support arm connection of claim 13, wherein the sealing ring is arranged on the support arm between the free end and the support arm ring.

15. A support arm connection connecting a support arm and a component, comprising:
a support arm holder disposed on the component and comprising an open end and an internal stop;
the support arm having a free end insertable into the open end of the support arm holder;
a housing ring mounted to the support arm at a position axially spaced from the free end;
the housing ring having an inside diameter disposed adjacent an outside diameter of the support arm;
a support arm ring fixedly secured to the support arm at a location between the free end and the housing ring;
wherein, when the support arm is inserted into and mounted to the support arm holder:
the internal stop abuts the support arm ring; and
the support arm ring is located inside the support arm holder, and
wherein the housing ring comprises a circumferential groove configured to receive a sealing ring.

16. The support arm connection of claim 10, wherein the support arm is a tube and is prevented from moving with respect to the support arm holder by a lock.

17. The support arm connection of claim 16, wherein the lock is mounted to the support arm holder.

18. The support arm connection of claim 16, wherein the lock is screw.

19. A support arm connection connecting a support arm and a component, comprising:
a support arm holder disposed on the component and comprising:
an open end; and
an internal stop axially spaced from the open end,
the support arm having a free end insertable into the open end of the support arm holder;
a housing ring mounted to the support arm at a position axially spaced from the free end;
the housing ring being sized and configured to slide into the support arm holder while mounted on the support arm;
a support arm ring fixedly secured to the support arm at a location between the free end and the housing ring;
the support arm ring being sized and configured to slide into the support arm holder while mounted on the support arm; and
a screw clamping or securing the housing ring to the support arm holder, wherein, when the support arm is mounted to the support arm holder, the support arm ring abuts the internal stop.

20. The support arm connection of claim 19, wherein the component is control panel.

\* \* \* \* \*